United States Patent
Brown et al.

[11] Patent Number: 6,142,524
[45] Date of Patent: Nov. 7, 2000

[54] SEAT BELT PRETENSIONER APPARATUS

[75] Inventors: Louis R. Brown, Oxford; Arnold J. Herberg, Davisburg, both of Mich.

[73] Assignee: TRW Vehicle Safety Systems Inc., Lyndhurst, Ohio

[21] Appl. No.: 09/211,253

[22] Filed: Dec. 14, 1998

[51] Int. Cl.⁷ ................................................ B60R 22/36
[52] U.S. Cl. ........................... 280/806; 180/268; 297/480
[58] Field of Search .................................. 280/805, 806, 280/801.1; 180/268; 297/477, 418, 480

[56] References Cited

U.S. PATENT DOCUMENTS

| | | |
|---|---|---|
| 4,655,312 | 4/1987 | Frantom et al. .................... 180/268 |
| 4,895,317 | 1/1990 | Rumpf et al. . |
| 4,984,651 | 1/1991 | Grosch et al. . |
| 5,247,296 | 9/1993 | Spies . |
| 5,338,063 | 8/1994 | Takeuchi et al. . |
| 5,568,939 | 10/1996 | Blackburn et al. ................... 280/806 |
| 5,571,253 | 11/1996 | Blackburn et al. . |
| 5,605,348 | 2/1997 | Blackburn et al. . |
| 5,671,949 | 9/1997 | Bauer et al. . |
| 5,673,932 | 10/1997 | Nitschke et al. ................ 280/806 X |
| 5,676,397 | 10/1997 | Bauer . |
| 5,718,451 | 2/1998 | White ............................ 180/268 X |
| 5,868,427 | 2/1999 | Mueller et al. ..................... 280/806 |
| 5,873,599 | 2/1999 | Bauer et al. ....................... 280/806 |
| 5,911,433 | 6/1999 | Swann ......................... 280/806 X |
| 5,936,186 | 8/1999 | Wier ............................ 180/268 X |
| 5,959,552 | 9/1999 | Cho . |
| 6,025,783 | 2/2000 | Steffens, Jr. .................. 180/268 X |

FOREIGN PATENT DOCUMENTS

| | | | |
|---|---|---|---|
| 552669A1 | 7/1993 | European Pat. Off. ............ | 280/806 |
| 4326198A1 | 2/1994 | Germany ........................ | 280/806 |
| 406286581 | 10/1994 | Japan ............................ | 280/806 |
| 9003902 | 4/1990 | WIPO ........................... | 280/806 |

*Primary Examiner*—Bryan Fischmann
*Attorney, Agent, or Firm*—Tarolli, Sundheim, Covell, Tummino & Szabo L.L.P.

[57] ABSTRACT

An apparatus (10) includes a crash sensor (49) which senses a crash event and provides a signal (50) indicative of the crash event. A transmitter (54) transmits a signal (58) in response to the crash sensor signal (50). A receiver (60), which is separated from the transmitter (54), receives the transmitter signal (58) and provides a control signal (80) upon receiving the transmitter signal (58). A buckle switch (34) is operable to detect a belted or an unbelted condition of a seat belt system (18). The apparatus (10) also includes an actuatable pretensioner device (49) which actuates to help to protect a vehicle occupant during a crash event. A power switch (82) receives the control signal (80) to connect the pretensioner device (49) electrically with a power source (35, 84) in response to the power switch (82) receiving the control signal (80) while the buckle switch 34 is detecting a belted condition.

12 Claims, 3 Drawing Sheets

SEAT BELT PRETENSIONER APPARATUS

TECHNICAL FIELD

The present invention relates to a vehicle occupant safety device and, more particularly, to a vehicle seat belt pretensioner apparatus.

BACKGROUND OF THE INVENTION

Typically, a seat belt pretensioner is activated by an electrical signal which travels over a conductive wire. The pretensioner is hard-wired to a suitable power source for providing power to the pretensioner. The pretensioner usually includes an electrically actuated squib which initiates flow of inflation fluid to tighten a seat belt around a vehicle occupant. Because it is desirable to actuate the pretensioner only when the occupant is belted in the seat, a sensor is used to detect when a belted condition exists. Typically, an additional electrical conductor provides power from the power source to the buckle sensor.

SUMMARY OF THE INVENTION

The present invention is directed to an occupant safety apparatus for use with a vehicle seat belt system. The apparatus includes a crash sensor which senses a crash event and provides a signal indicative of the crash event. A transmitter broadcasts a signal in response to the crash sensor signal. A receiver, which is spaced apart from the transmitter, provides a control signal upon receiving the transmitter signal. A buckle switch is operable to detect a belted or an unbelted condition of the seat belt system. pretensioner device is actuatable to help protect a vehicle occupant during a crash event. A power switch is electrically connected with the receiver and the pretensioner device. The power switch electrically actuates the pretensioner device in response to the power switch receiving the control signal while the buckle switch is detecting a belted condition.

BRIEF DESCRIPTION OF THE DRAWINGS

Preferred embodiments of the present invention are illustrated in the accompanying drawings, in which.

DESCRIPTION OF PREFERRED EMBODIMENTS

Figure 1:
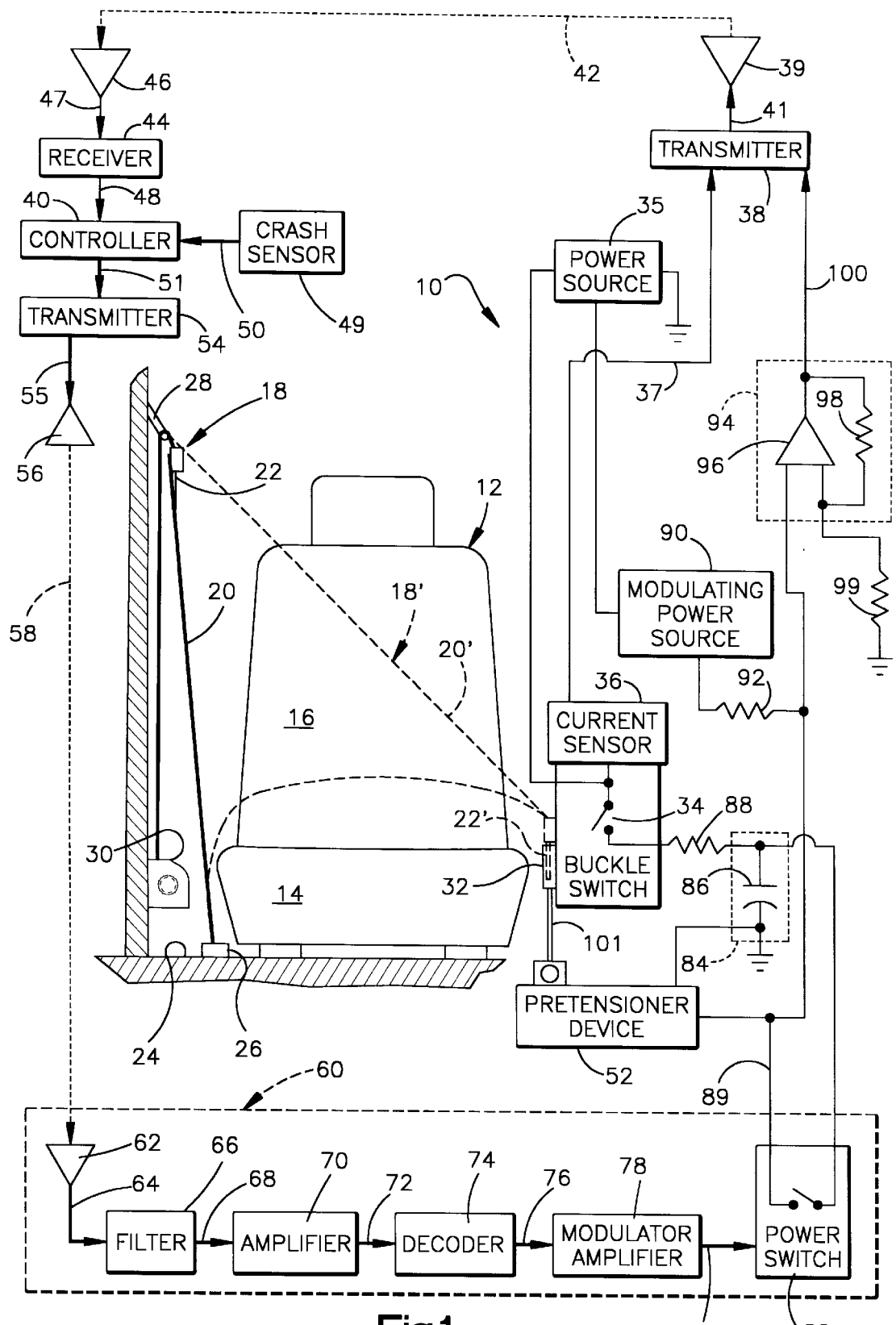
FIG. 1 is a schematic representation of a first embodiment of an apparatus in accordance with the present invention.

FIG. 1 illustrates a first embodiment of a vehicle occupant safety apparatus, indicated at 10, in accordance with the present invention. The apparatus 10 is installed in a vehicle associated with a vehicle seat 12. The seat 12 includes a seat cushion 14 and a seat back portion 16 extending upwardly from the seat cushion 14.

The apparatus 10 is used in connection with a vehicle seat belt restraint system 18, which is operatively associated with the seat 12. The particular system 18 illustrated in FIG. 1 is a three-point active seat belt system. The configuration of the seat belt system is a matter of design choice, as any suitable seat belt system should suffice. For example, the seat belt system 18 may be a passive seat belt system, which automatically wraps around the occupant upon a preselected event. Other seat belt systems, such as an active or passive two-point system, also could be used.

The seat belt system 18 includes a length of seat belt webbing 20 and a buckle tongue 22 slidably attached to the webbing 20. The seat belt webbing 20 is attached to a lower portion of a vehicle body 24 adjacent one side of the seat 12 by a floor anchor 26. The webbing 20 extends upwardly from the floor anchor 26 to a D-ring 28, through which the webbing 20 extends. The webbing 20 also is attached to a seat belt retractor 30 adjacent the same side of the seat 12. The seat belt retractor 30 includes a spool (not shown), which is rotatable to wind a portion of the webbing 20 around the spool. The seat belt system 18 is shown in solid lines in an unbelted condition and in dashed lines in a belted condition, indicated at 18'. A prime symbol also has been added to certain reference numbers to indicate the belted condition for the corresponding elements. The buckle tongue 22' is adjustable along the length of the webbing 20' to divide the webbing 20' into lap and chest portions, which may be positioned around a vehicle occupant.

The seat belt system 18 also includes a seat belt buckle 32 located adjacent the side of the seat 12 opposite the anchor 26 and the retractor 30. The buckle 32 releasably receives the buckle tongue 22 to define the belted condition. A buckle switch 34 is operatively connected with the buckle 32. Preferably, the buckle switch 34 is located within the buckle 32. Alternatively, the buckle switch 34 may be mounted exterior to the buckle 32. The buckle switch 34 is operable to detect the condition of the seat belt system 18, namely whether a belted or an unbelted condition exists. The buckle switch 34 has at least two states which correspond to the two conditions of the seat belt system 18. The buckle switch 34 is electrically connected with a power source 35. The power source 35 may be a vehicle battery, an alternator or a separate power circuit.

The apparatus preferably includes a sensor which is operable to sense when the buckle switch 34 is closed, i.e. when a belted or an unbelted condition exists. Preferably, the buckle switch sensor is a current sensor 36 which detects current flow from the power source 35 through the buckle switch 34. The current sensor 36 may be a current sense resistor, a hall effect sensor, or other circuitry capable of detecting the flow of current through the buckle switch 34. Other sensing devices also may be used to detect whether the seat belt system is in a belted or unbelted condition. Preferably, the current sensor 36 is part of the buckle switch 34, although it could be a separate device.

The current sensor 36 provides a buckle switch signal 37 to a remote transmitter 38 which is electrically connected with said current sensor 36 of the buckle switch. The buckle switch signal 37, for example, may have a first value indicative of current flowing through the buckle switch 34, thereby indicating a belted condition. The buckle switch signal 37 has a different value for an unbelted condition.

The transmitter 38 is electrically connected with a suitable antenna 39 for providing a signal to a central controller 40. In particular, the transmitter 38 appropriately modulates the buckle signal 37 and provides a transmitter signal 41 to the antenna 39. The antenna 39 then broadcasts a remote transmitter signal 42, preferably as a radio frequency signal, which includes an indication of whether a belted or unbelted condition exists.

A first receiver 44 is electrically connected with the central controller 40 and to an appropriate antenna 46 for receiving the signal 42 broadcast by the remote transmitter 38. The receiver 44 receives a signal 47 from the antenna 46.

The receiver 44 appropriately filters and demodulates the signal 47 and provides an electrical signal 48 to the controller 40, which is indicative of the condition of the buckle switch 34, i.e., belted or unbelted.

The apparatus 10 also includes a crash sensor 49 which provides a crash sensor signal 50 to the controller 40 upon the occurrence of a vehicle crash event. The crash sensor 49 may be an acceleration sensing device, such as an accelerometer, an inertia sensing device, a crush zone sensor or any other suitable crash sensing device. The controller 40 contains appropriate circuitry and/or is programmed to determine if the crash sensor signal 50 indicates a crash event requiring actuation of an actuatable seat belt pretensioner device 52. Upon the controller 40 receiving a crash sensor signal 50 indicating a crash event for which actuation of the pretensioner device 52 is required and upon receiving the signal 42 indicating a belted condition of the seat belt system 18, the controller 40 provides a control signal 51 to a transmitter 54.

The transmitter 54 preferably is a low power radio frequency transmitter of known configuration. The transmitter 54 encodes and modulates the control signal 51 to a predetermined frequency. The transmitter 54 preferably provides a unique, coded electrical signal 55 to an antenna 56. The antenna 56 may be part of the transmitter 54 or a separate structure. The antenna 56 emits the coded transmitter signal 55, suitably as an RF signal 58, in broadcast fashion according to the antenna configuration.

The RF signal 58 emitted from the antenna 56 is received at a receiver module 60. The elements within the receiver module block 60 diagrammatically illustrate the function of the receiver module 60. The receiver module 60 includes an antenna 62 which receives the RF signal 58 and converts it to an electrical signal 64. The electrical signal 64 is provided to an appropriate filter 66, which removes unwanted frequency components from the electrical signal 64. The filter 66 provides a filtered signal 68 to an amplifier 70. The filtered signal 68 suitably corresponds to the transmitter signal 55. The amplifier 70 then provides an amplified signal 72 to a decoder 74. The decoder 74 decodes the amplified signal 72 to ensure that the RF signal 58 originated from the proper controller 40 and is intended to actuate the pretensioner device 52. The decoder 74 provides a decoded signal 76 to a modulator amplifier 78. Upon receiving the decoded signal 76, the modulator amplifier 78 provides an appropriate control signal 80 to a power switch 82.

The power switch 82 is electrically connected with the buckle switch 34, suitably through an electrical energy storage device 84. Preferably, the energy storage device 84 includes an energy reserve capacitor 86 having one lead connected to the buckle switch 34 through a resistor 88 and another lead connected to electrical ground.

When the buckle switch 34 is closed, the energy reserve capacitor 86 stores electrical energy provided by the power source 35. In particular, the capacitor 86 is charged to a predetermined voltage level, suitably the voltage of the power source 35 minus the voltage drop across the resistor 88. Advantageously, even if the power source 35 is inoperative to provide power to the pretensioner device 52, such as being disconnected during a vehicle crash event, the energy storage capacitor 86 can still provide sufficient power to activate the pretensioner device to help protect the vehicle occupant.

The power switch 82 is operable to connect the high side of the energy reserve capacitor 86 electrically with pretensioner device 52. The power switch 82 may be an electromechanical relay, a transistor or any suitable type of electrical switch device. The power switch 82 has at least two states, namely, open or closed. The open state corresponds to a normal operating condition of the switch 82, in which the switch prevents current flow through the switch and to the pretensioner device 52. When the buckle switch 34 is in a closed position and the power switch 82 is open, current may flow from the power source 35 to ground through the buckle switch 34, the resistor 88 and the capacitor 86.

In this mode of operation, the capacitor 86 reaches its maximum charge. In addition, the current flow through the buckle switch 34 is detected by the current sensor 36, which provides the buckle switch signal 37 indicative of the belted condition. The transmitter 38, in turn, broadcasts the remote transmitter signal 42 to the controller 40. Accordingly, upon the crash sensor 49 sensing a vehicle crash event, the controller 40 can control actuation of the pretensioner device 52, as described above.

In this embodiment, the pretensioner device 52 is electrically connected with the power switch 82, such as through an input line 89. When the power switch 82 is closed, the buckle switch 34 is electrically connected with the pretensioner device 52 through the power switch, and the energy storage device 84. The power switch 82 closes upon receiving an appropriate control signal 80 from the modulator amplifier 78. This preferably corresponds to a situation when both the crash sensor 49 detects a vehicle crash event and the current sensor 36 detects a belted condition of the seat belt system 18. Accordingly, when both the buckle switch 34 is closed and the crash sensor 49 provides the crash sensor signal 50 indicating a vehicle crash event, the controller 40 remotely activates the power switch 82 to complete an electrical path from the energy storage device 84 to the pretensioner device 52. Preferably, the power source 35 remains connected with the system 10, such that current flows from the power source 35 to the pretensioner device 52, thereby actuating the pretensioner device.

Preferably, a modulating power source 90 is electrically connected with the input line 89 to the pretensioner device 52 through a resistor 92. In order to ensure that the pretensioner device 52 is operational, a current sensor 94 monitors the flow of electrical current from the modulating power source 90 through the pretensioner device. Preferably, the modulating power source 90 periodically provides a low voltage trickle signal to the pretensioner device 52 through the resistor 92. The voltage drop across the resistor 92 provides a low level current signal which flows through the pretensioner device 52. This low level current signal is substantially less than the amount of current required to effect actuation of the pretensioner device 52. For example, the modulating power source 90 may provide a test voltage pulse of about 5 mV about every 100 milliseconds, which results in a relatively small amount of current flow through the pretensioner device 52.

The current sensor 94 includes a first input connected to the input lead 89 of the pretensioner device 52 for monitoring the trickle current through the pretensioner device. Because the amount of trickle current is substantially low, the current sensor 94 preferably includes an amplifier 96. The amplifier 96 provides a suitable amount of gain by a feedback resistor 98 connected between the output of the amplifier and a second input of the amplifier 96. The second input of the amplifier 96 also is connected to electrical ground through a resistor 99. The differential voltage between inputs of the amplifier is low, preferably about 1.0 mV.

The current sensor 94 provides a pretensioner status signal 100 to the transmitter 38 which is indicative of the operational status of the pretensioner device 52. The transmitter 38 appropriately modulates the pretensioner status signal 100 and broadcasts it as part of the signal 42 to the controller 40. Accordingly, the controller 40 can control actuation of the pretensioner device 52 as a function of the pretensioner device being properly operational or ready to fire.

The remote transmitter 38 preferably transmits the signal 42 containing status information relating to both the condition detected by the buckle switch 34 and information indicative of the operational status of the pretensioner device 52. The collective status information may be provided in the same or consecutive signals from the transmitter 38. In this preferred embodiment, the controller 40 provides the control signal 51 to effect actuation of the pretensioner device 52 upon (i) the buckle switch signal 37 indicating a belted condition, (ii) the pretensioner status signal 100 indicating an operational-ready condition for the pretensioner device, and (iii) the crash sensor signal 50 indicating a vehicle crash event.

Advantageously, the pretensioner device 52 is electrically isolated from the power source 35 through two switch devices, namely the buckle switch 34 and the power switch 82. This provides a dual stage safety mechanism which inhibits inadvertent actuation of the pretensioner device 52. When the pretensioner device 52 is actuated, it tensions the seat belt webbing 20 around an occupant of the vehicle seat 12 in a known manner, such as, for example, by moving the buckle 32 toward the vehicle floor 24. This helps to protect the vehicle occupant during a crash event.

Figure 2:
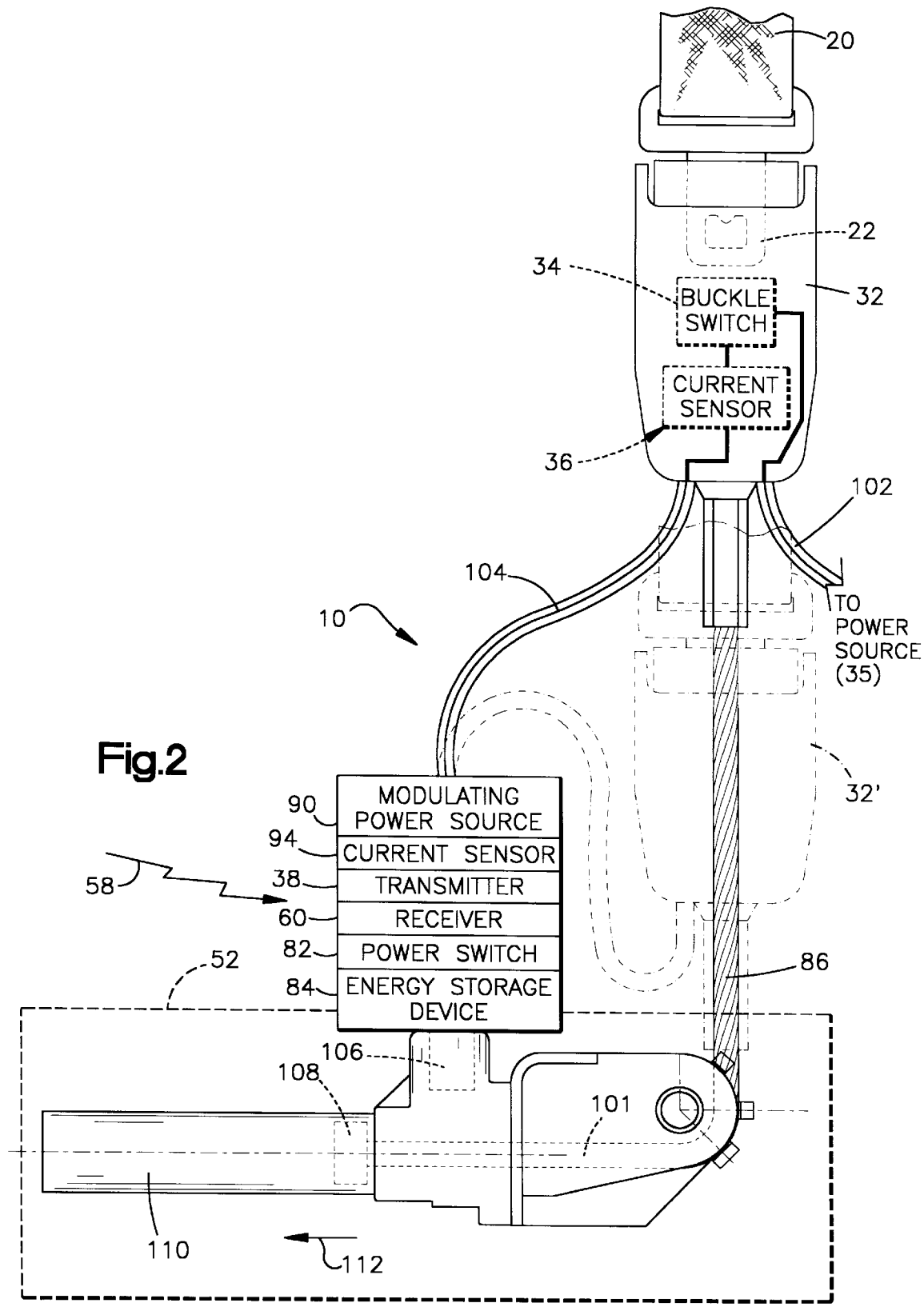
FIG. 2 is an enlarged view of a portion of the apparatus of FIG. 1.

FIG. 2 illustrates a suitable pretensioner device 52 and seat belt buckle assembly 32 corresponding to the embodiment of FIG. 1. The buckle tongue 22 is latched within the buckle 32 in a known manner. The seat belt buckle 32 is operatively connected with the pretensioner device 52 by a length of cable 101. The cable 101 is drawn within the pretensioner device 52 upon actuation of the pretensioner device 52.

The buckle switch 34 is electrically connected with the power source 35 through an appropriate power supply cable having a conducting wire 102. While the wire 102 is illustrated as a single wire, it will be understood and appreciated that typically a pair of wires are used to provide power to the equipment within the buckle 32. The current sensor 36 also is illustrated schematically as being located within the buckle 32, preferably part of the buckle switch 34. It will be understood and appreciated that the location of the components shown in FIG. 2 are for purposes of illustration and that various components may be located at different locations without departing from the present invention.

The receiver 60 preferably is substantially identical to that shown and described with respect to FIG. 1. The receiver 60 receives the radio frequency transmitter signal 58 broadcast from the transmitter (FIG. 1). The receiver 60, which preferably includes the power switch 82, is electrically connected with the buckle switch 34 and current sensor 36 through an appropriately insulated conducting wire 104, which may be a pair of wires. Upon the tongue 22 being appropriately latched within the buckle 32 and upon the crash sensor indicating a crash event, the buckle switch 34 and the power switch 82 are activated to complete an electrical path from the energy storage device 84 to the pretensioner device 52. The actuation of the pretensioner device 52 may be further conditioned upon the status of the pretensioner device, as described above.

The conducting wire 104 is connected with the pretensioner device 52 to provide current to an initiator 106. The initiator 106, which is part of the pretensioner device 52, may be any suitable pyrotechnic cartridge. The initiator 106 includes an ignitable material which, when actuated by electrical current to the initiator 106, provides a flow of fluid within the pretensioner device 52. The pretensioner device 52 also includes a piston 108 mounted for lateral movement within a cylinder 110. The piston 108 is operatively connected with the cable 101. When the current from the energy storage device 84 actuates the initiator 106, fluid flows into the cylinder 110. This causes the piston 108 to move in the direction of arrow 112. Movement of the piston 108 in the direction of arrow 112 causes the cable 101 to be drawn within the pretensioner device 52. This further results in a forceful, downward movement of the buckle 32, as indicated by dashed lines at 32'. Movement of the buckle 32 tightens the seat belt webbing 20 against a vehicle occupant. This helps to protect the occupant during the crash event.

Examples of other suitable seat belt pretensioner devices are disclosed in U.S. Pat. Nos. 5,671,949 and 5,676,397, both of which are assigned to TRW, Inc. and incorporated herein by reference.

Figure 3:
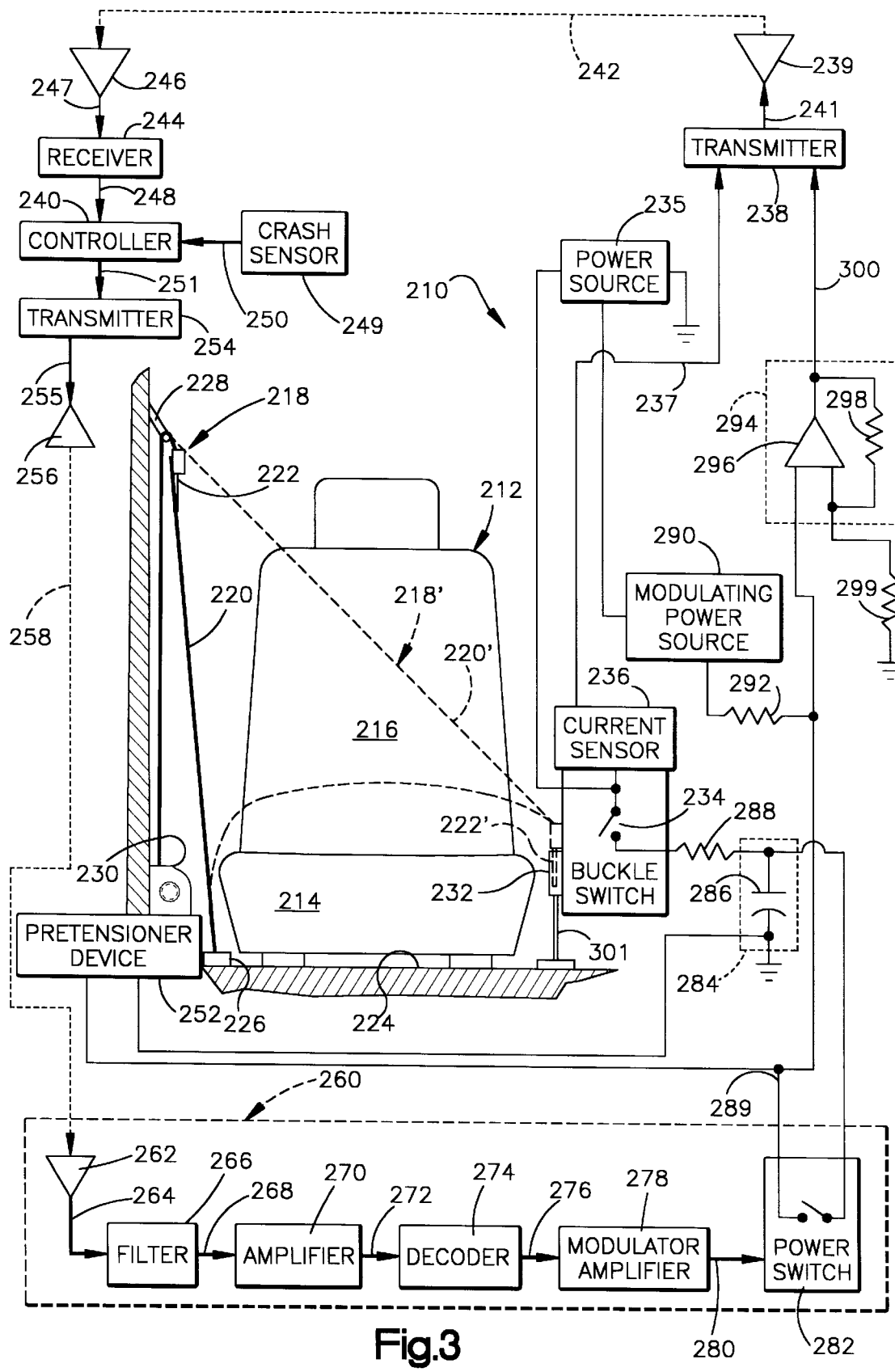
FIG. 3 is a schematic representation of a second embodiment of an apparatus in accordance with the present invention.

FIG. 3 illustrates an alternative embodiment of a seat belt pretensioner apparatus 210 in which similar reference numbers, increased by adding 200, are used to identify corresponding elements shown in FIG. 1. The apparatus 210 is installed in a vehicle having a vehicle seat 212. The seat 212 includes a seat cushion 214 and a seat back portion 216 extending upwardly from the seat cushion 214.

A seat belt restraint system 218 is operatively associated with the seat 212. The system 218 may be any suitable seat belt system as described above. In this embodiment, the system 218 includes seat belt webbing 220 and a buckle tongue 222 slidably attached to the webbing 220. The seat belt webbing 220 is attached to the floor 224 of the vehicle by a floor anchor 226. The webbing 220 extends upwardly from the floor anchor 226 to a D-ring 228, through which the webbing 220 extends. The webbing 220 also is attached to an actuatable seat belt retractor 230, which winds the webbing 220 onto a spool (not shown). The seat belt system 218 is shown in solid lines in an unbelted condition and in dashed lines in a belted condition, indicated at 218'. The tongue 222 is adjustable along the length of the webbing 220.

The seat belt system 218 also includes a seat belt buckle 232 which releasably receives the buckle tongue 222. The buckle 232 is operatively connected to the floor 224 of the vehicle by a connecting element 301, which may be a cable, a rod, or other suitable connecting elements. The buckle 232 includes a buckle switch 234, which detects the condition of the seat belt system, namely whether a belted or an unbelted condition exists. The buckle switch 234 is electrically connected with a power source 235, as described above.

The apparatus 210 preferably includes a sensor which is operable to sense when the buckle switch 234 is closed, i.e. when a belted or an unbelted condition exists. Preferably, the sensor is a current sensor 236 substantially identical to that described above with respect to FIG. 1. The current sensor 236 provides a buckle switch signal 237 to a remote transmitter 238 which is electrically connected with the current sensor 236. The buckle switch signal 237 has a value which indicates whether a belted or unbelted condition exists.

The transmitter 238 is electrically connected with a suitable antenna 239 for providing a signal 241 to an antenna. The antenna 239 broadcasts a remote transmitter signal 242, which corresponds to the value of the buckle switch signal 237, to a central controller 240.

A first receiver 244 is electrically connected with the controller 240 and to an appropriate antenna 246 for receiving the remote transmitter signal 242. The receiver 244 receives an electrical signal 247 from the antenna 246, which is appropriately filtered and demodulated. The receiver 244 provides a signal 248 to the controller 240, indicating the condition of the buckle switch 234.

The apparatus 210 also includes a conventional crash sensor 249, such as described with respect to the embodiment of FIG. 1. The crash sensor 249 provides a crash sensor signal 250 to the controller 240 upon sensing the occurrence of a vehicle crash event. The controller 240 determines if the crash sensor signal 250 requires actuation of a seat belt pretensioner device 252. The pretensioner device 252 of this embodiment is operatively connected with the retractor 230. Upon being actuated, the pretensioner device 252 causes the seat belt webbing 220 to wind rapidly around the retractor spool, thereby tightening the seat belt webbing around a vehicle occupant.

The controller 240 provides a control signal 251 to a central transmitter 254. Preferably, the control signal 251 is conditioned upon the controller 240 receiving both the crash sensor signal 250 indicating a crash event and the remote transmitter signal 242 indicating a belted condition. The transmitter 254 preferably is substantially identical to that described with respect to the embodiment of FIG. 1. The transmitter 254 provides a predetermined encoded transmitter signal 255 to an antenna 256. The antenna 256 emits a corresponding RF signal 258 upon receiving the transmitter signal 255.

The RF signal 258 broadcast from the transmitter 254 and antenna 256 is received at a receiver module 260. The receiver module 260 is substantially identical to that described with respect to FIG. 1. The receiver module 260 includes an antenna 262 which receives the RF signal 258 and converts it to an electrical signal 264. The electrical signal 264 is provided to an appropriate filter 266, which provides a filtered signal 268 to an amplifier 270. The amplifier 270 provides an amplified signal 272 to a decoder 274. The decoder 274 decodes the amplified signal 272 and provides a decoded signal 276 to a modulator amplifier 278. The modulator amplifier 278 provides an appropriate control signal 280 to a power switch 282.

The power switch 282 is electrically connected with the buckle switch 234 through an electrical energy storage device 284, as described above. Preferably, the energy storage device 284 includes an energy reserve capacitor 286 connected between the buckle switch 234 by a resistor 288 and electrical ground.

The power switch 282 is operable to connect the high side of the energy reserve capacitor 286 electrically with pretensioner device 252. The power switch 282 is substantially identical to that described above. It controls current flow to the pretensioner device 252. Accordingly, upon the crash sensor 249 sensing a vehicle crash event, the controller 240 can control actuation of the pretensioner device 252, such as described above.

In this embodiment, the pretensioner device 252 is electrically connected with the power switch 282, such as through a conducting wire 289. When the power switch 282 is closed, the buckle switch 234 is electrically connected with the pretensioner device 252 through the power switch, and the energy storage device 284. The power switch 282 closes upon receiving an appropriate control signal 280 from the modulator amplifier 278. This preferably corresponds to a situation when both the crash sensor 249 detects a vehicle crash event and the current sensor 236 detects a belted condition of the seat belt system 218 at the buckle switch 234. Accordingly, when both the buckle switch 234 is closed and the crash sensor 249 provides the crash sensor signal 250 indicating a vehicle crash event, the power switch 282 is activated to complete an electrical path from the energy storage device 284 to the pretensioner device 252. Ideally, the power source 235 remains connected with the system 210, such that current flows from the power source 235 to the pretensioner device 252, thereby actuating the pretensioner device.

Like the embodiment of FIG. 1, a modulating power source 290 is electrically connected with the input lead 289 of the pretensioner device 252 through a resistor 292. A current sensor 294 also is connected with the input lead 289 to monitor the flow of electrical current from the modulating power source 290 through the pretensioner device 252. The modulating power source 290 operates substantially identically to that described with respect to FIG. 1.

The current sensor 294 includes a first input connected to the input lead 289 of the pretensioner device 252 for monitoring the low level test current through the pretensioner device. The current sensor 294 includes an amplifier 296 having a feedback resistor 298 connected between the output of the amplifier and a second input of the amplifier 296 to provide an appropriate amount of gain. The second input of the amplifier 296 also is connected to electrical ground through a resistor 299. The differential voltage between inputs of the amplifier is low, preferably about 1.0 mV.

The current sensor 294 provides a pretensioner status signal 300 to the transmitter 238 which is indicative of the operational status of the pretensioner device 252. Preferably, the remote transmitter signal 242 includes information indicative of the operational status of the pretensioner device 252 as well as of the buckle switch 234. The collective information may be provided in the same or consecutive signals provided by the transmitter 238. Accordingly, the controller 240 is able to control actuation of the pretensioner device 252 based upon the operational status of the pretensioner device and the condition detected by the buckle switch 234. Preferably, the controller 240 provides the control signal 251 to effect actuation of the pretensioner device 252 upon (i) the buckle switch signal 237 indicating a belted condition, (ii) the pretensioner status signal 300 indicating an operational-ready condition for the pretensioner device, and (iii) the crash sensor signal 250 indicating a vehicle crash event.

When the pretensioner device 252 is actuated, it tensions the seat belt webbing 220 around the vehicle occupant, suitably by rapidly winding the webbing around the spool of the retractor device 230. An example of a suitable retractor pretensioner device is disclosed in U.S. Pat. No. 5,344,095, which is assigned to TRW, Inc. and incorporated herein by reference.

From the above description of the invention, those skilled in the art will perceive improvements, changes and modifications. Such improvements, changes and modifications within the skill of the art are intended to be covered by the appended claims.

Having described the invention, the following is claimed:

1. A vehicle safety apparatus for use with a seat belt system comprising:
   a crash sensor which senses a crash event and provides a signal indicative of the sensed crash event
   a central transmitter which broadcasts a transmitter signal in response to the crash sensor signal;

a remote receiver spaced apart from said transmitter, said receiver receiving the transmitter signal and providing a receiver signal in response to the transmitter signal;

a power source;

a buckle switch electrically connected with said power source, said buckle switch being operable to detect a belted or an unbelted condition of the seat belt system;

an actuatable pretensioner device which, when actuated, helps to protect a vehicle occupant during a crash event by tightening a seat belt around a vehicle occupant;

a power switch electrically coupled with said buckle switch and said power source, said power switch being operable to connect said pretensioner device to said power source in response to said power switch receiving said receiver signal while the buckle switch is detecting a belted condition; and a controller in electrical communication with said crash sensor, said controller providing a control signal to said central transmitter upon said crash sensor signal indicating a crash event which requires activation of said pretensioner device.

2. The apparatus of claim 1 wherein said controller is responsive to the detected condition of said buckle switch and to said crash sensor signal, said controller providing the control signal to said central transmitter up on the crash sensor signal indicating a crash event and the buckle switch detecting a belted condition of the seat belt system.

3. The apparatus of claim 2 further comprising a remote transmitter electrically connected with said buckle switch, and a central receiver electrically connected with said controller, said remote transmitter transmitting a buckle switch signal which indicates the condition detected by said buckle switch, said central receiver receiving the buckle switch signal and providing a signal to the controller indicative of the condition of said buckle switch.

4. The apparatus of claim 3 wherein said remote transmitter is electrically connected with said pretensioner device and operative to transmit a status signal for receipt by said central receiver indicative of the operational status of said pretensioner device, said controller providing the control signal to said central transmitter upon (i) the crash sensor signal indicating a vehicle crash event and (ii) the signal from the remote transmitter indicating both a belted condition of the seat belt system and an operational-ready status of said pretensioner device.

5. The apparatus of claim 2 further comprising a current sensor which is operable to sense electrical current flow through said buckle switch when the buckle switch is detecting a belted condition of the seat belt system, said current sensor providing a buckle switch signal indicative of the condition of the seat belt system, said controller providing the control signal to said central transmitter in response to the buckle switch signal.

6. The apparatus of claim 5 further comprising a remote transmitter electrically connected with said current sensor, a central receiver electrically connected with said controller, said remote transmitter transmitting a remote buckle signal indicative electrical current flow through said buckle switch, said central receiver receiving the remote buckle signal from the remote transmitter and providing a signal to the controller indicative of the condition of the seat belt system.

7. A vehicle safety apparatus comprising:

a sensor for sensing a vehicle condition and providing a signal indicative of said vehicle condition;

a central transmitter responsive to said sensor signal, said central transmitter broadcasting a transmitter signal upon receiving the sensor signal;

a seat belt assembly including a buckle and a buckle tongue releasably connectable with said buckle, said seat belt assembly including a buckle switch operable to detect a belted or unbelted condition of said seat belt assembly;

a remote receiver spaced apart from said first transmitter and responsive to the transmitter signal, said remote receiver providing an activation control signal in response to the transmitter signal;.

an electrically actuatable pretensioner device operatively connected with said seat belt assembly which, when actuated, helps to protect a vehicle occupant during a crash event;

a power switch electrically connected with said receiver and said buckle switch, said power switch effecting actuation of said pretensioner device in response to receiving the activation control signal of said receiver while said buckle switch is detecting a belted condition of said seat belt assembly; and a controller electrically connected with said central transmitter, said controller controlling said central transmitter in response to the sensor signal and said buckle switch detecting a belted condition of said seat belt assembly, which, in turn, controls actuation of said pretensioner device.

8. The apparatus of claim 7 further comprising a remote transmitter electrically connected with said buckle switch, a central receiver electrically connected with said controller, said remote transmitter transmitting a remote buckle signal which indicates the condition of said seat belt assembly detected by said buckle switch, said central receiver receiving the remote buckle signal and providing a signal to the controller indicative of the condition detected by said buckle switch in response to the remote buckle signal, said controller controlling said central transmitter, which, in turn, controls actuation of said pretensioner device in response to the sensor signal and the remote buckle signal.

9. The apparatus of claim 8 wherein said remote transmitter is electrically connected with said pretensioner device and operative to transmit a status signal for receipt by said central receiver which is indicative of the operational status of said pretensioner device, said controller controlling said central transmitter upon (i) the crash sensor signal indicating a crash event and (ii) the signal from said remote transmitter indicating both a belted condition of said seat belt assembly and an operational-ready status of said pretensioner device.

10. The apparatus of claim 7 further comprising a current sensor which is operable to sense current flow through said buckle switch when said seat belt assembly is in the belted condition, said current sensor providing a current sensor signal indicative of the condition of said buckle switch, said controller being responsive to the buckle switch signal to provide the control signal to said first transmitter.

11. The apparatus of claim 10 further comprising a remote transmitter electrically connected with said current sensor, a first receiver electrically connected with said controller, said remote transmitter transmitting a buckle signal indicative of electrical current flow through said buckle switch, said central receiver receiving the buckle signal from said remote transmitter and providing a signal to the controller indicative of the condition of said seat belt assembly.

12. A vehicle safety apparatus comprising:

a sensor for sensing a vehicle condition and providing a signal indicative of said vehicle condition;

a central transmitter responsive to said sensor signal, said central transmitter broadcasting a transmitter signal upon receiving the sensor signal;

a seat belt assembly including a buckle and a buckle tongue releasably connectable with said buckle, said seat belt assembly including a buckle switch operable to detect a belted or unbelted condition of said seat belt assembly;

a remote receiver spaced apart from said first transmitter and responsive to the transmitter signal, said remote receiver providing an activation control signal in response to the transmitter signal;

an electrically actuatable pretensioner device operatively connected with said seat belt assembly which, when actuated, helps to protect a vehicle occupant during a crash event; and a power switch electrically connected with said receiver and said buckle switch, said power switch effecting actuation of said pretensioner device in response to receiving the activation control signal of said receiver while said buckle switch is detecting a belted condition of said seat belt assembly, wherein said buckle switch has a first state which corresponds to a belted condition and a second state which corresponds to an unbelted condition, said apparatus further including a buckle switch sensor which senses the state of said buckle switch and provides a buckle switch signal indicative of the state of said buckle switch, said central transmitter providing the transmitter signal in response to the buckle switch signal indicating a belted condition of said seat belt assembly and upon the crash sensor signal indicating a vehicle crash event.

* * * * *